United States Patent [19]

Cragoe, Jr. et al.

[11] 3,894,065

[45] July 8, 1975

[54] ARYL-OXO-ALKANOIC ACIDS

[75] Inventors: Edward J. Cragoe, Jr., Lansdale; Kenneth L. Shepard, Ambler; Otto W. Woltersdorf, Jr., Chalfont, all of Pa.

[73] Assignee: Merck & Co., Inc., Rahway, N.J.

[22] Filed: Apr. 27, 1973

[21] Appl. No.: 355,121

[52] U.S. Cl. ............ 260/408; 260/308 D; 260/338; 260/345.9; 260/404; 260/410.5; 260/410.6; 260/410.9 R; 260/413; 260/465 G; 260/465 R; 260/469; 260/590 R; 260/612 D; 260/618 R; 260/651 R; 424/315

[51] Int. Cl. .................................... C07c 63/52

[58] Field of Search ....................... 260/413, 408

[56] References Cited
UNITED STATES PATENTS 2,580,459  1/1952  Papa et al. ........................ 260/408

OTHER PUBLICATIONS

Royals, Adv. Org. Chem., pp. 594, 595, 833 and 834.
Papa et al., J.A.C.S. 69, pp. 3018-3022.

*Primary Examiner*—Lewis Gotts
*Assistant Examiner*—Ethel G. Love
*Attorney, Agent, or Firm*—Hesna J. Pfeiffer; Thomas E. Arther; J. Jerome Behan

[57] ABSTRACT

Novel 8-aryl-9-oxo-alkanoic acids and certain higher homologs thereof are prepared by reaction of an appropriate 1-aryl-2-alkanone with a ω-haloalkanoic acid ester or ω-haloalkanonitrile and an aralkyl or aralkenyl halide followed by hydrolysis of the resulting ester. The compounds have prostaglandin $E_1$-like activity, and are particularly useful as renal vasodilators, for the treatment of ulcers, hypertension and asthma and for the prevention of thrombus formation.

11 Claims, No Drawings

ARYL-OXO-ALKANOIC ACIDS

SUMMARY OF THE INVENTION

This invention relates to a new class of aryl-oxo-alkanoic acids. More particularly, these compounds can be described as a group of novel alkanoic acids having an aliphatic chain of at least 10 carbon atoms wherein one of such carbon atoms is oxygenated and wherein a carbon adjacent to the oxygenated carbon is substituted with an aryl radical and with an aralkyl or aralkenyl radical. The salts, esters and amides of such carboxylic acids are also included within the ambit of the invention. There are also provided by this invention synthetic processes for making these compounds from a 1-aryl-2-loweralkanone. Additional objects and purposes of the invention will become clear from the ensuing detailed description of it.

The new aryl-oxo-alkanoic acids of this invention may be generally represented by the formula:

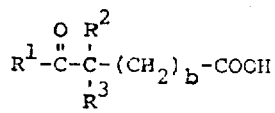

In this formula $R^1$ represents a lower alkyl or cycloalkyl of 1–3 carbon atoms, such as methyl, ethyl, propyl, cyclopropyl, or isopropyl.

$R^2$ in formula I is an aromatic radical, and preferably the phenyl group. However, it may also be mononuclearly substituted in the para position with halogen, e.g., chloro, bromo, or iodo, lower alkyl or lower alkoxy both of 1–4 carbon atoms, such as methyl, ethyl, propyl, butyl, methoxy, ethoxy, isopropoxy and the like.

$R^3$ in formula I is an aralkyl or aralkenyl radical. The nature of this substituent is an important aspect of the invention because the number of carbon atoms in the alkyl or alkenyl chain influences the biological activity of the new alkanoic acid compounds. When $R^3$ is aralkyl, the alkyl chain contains 1, 3, 5 or 7 carbons, i.e., an odd number of carbon atoms up to and including 7. When $R^3$ is aralkenyl, it is preferred that the alkenyl part of the radical be an unsaturated 3 carbon chain, and most preferably the 1-propenyl radical. The aryl moiety of these aralkyl or aralkenyl substituents is preferably phenyl or substituted phenyl. There may be one or two nuclear substituents of the type represented by halogen (chloro, bromo, iodo, fluoro), hydroxy, cyano, trifluoromethyl, hydroxyloweralkyl such as hydroxymethyl, 2-hydroxyethyl, hydroxypropyl, acyloxyloweralkyl (and preferably loweralkanoyloxyloweralkyl) of the type acetoxymethyl, acetoxyethyl, benzoyloxypropyl, propionoxymethyl and the like. The substituent may also be loweralkyl or lower alkoxy both of 1–4 carbon atoms, as exemplified above with respect to the description of $R^2$. The location of these substituents on the phenyl ring is not critical, although ortho substitution is preferred. When the ring disubstituted, the particular substituents may be the same or different.

The symbol "$b$" in formula I represents 6, 7 or 8. Thus, the aliphatic chain of the alkanoic acids of this invention contains at least 10 carbon atoms (where $R^1$ is methyl and $b$ is 6).

Formula I represents a free carboxylic acid, and such free acids are frequently referred to in the description of this invention. It is to be understood, however, that also included within the scope of this invention are the salts, esters and amides of the free acids. Included and preferred within the salts are the pharmacologically acceptable salts such as those formed with pharmacologically acceptable metal cations, ammonium, amine and quaternary ammonium cations. Examples include the alkali and alkaline earth metal salts, e.g., sodium, potassium, lithium, magnesium, calcium. Cations of heavy metals such as iron, zinc and manganese may also be used. Amine salts may be obtained from primary, secondary or tertiary amines, examples being methylamine, dimethylamine, triethylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and loweralkyl derivatives thereof, e.g., 1-methylpiperidine, 4-ethylmorpholine, 1-isopropylpyrrolidine, 2-methylpyrrolidine, 1,4-dimethylpiperazine, 2-methylpipiridine, and the like, as well as amines containing hydrophilic groups, e.g., mono-, di-, and triethanolamine, ethyldiethanolamine, N-butylethanolamine, 2-amino-1-butanol, and 2-amino-2-ethyl-1,3-propanediol.

As esters, there are included the lower alkyl, aryl, aralkyl, aralkenyl and acyloxyalkyl esters, examples of which are methyl, ethyl, propyl, isopropyl, t-butyl, hexyl, phenyl, benzyl, cinnamyl, acetoxymethyl, pivaloyloxymethyl, benzhydryl, methoxymethyl esters.

In addition, the carboxylic acid group can be completely replaced by a 5-tetrazoyl group.

From the above, it will be appreciated that those compounds in which $R^1$ is methyl and $b$ represents 6 are 8-phenyl (or substituted phenyl) 8-aralkyl or aralkenyl-9-oxodecanoic acids. Those in which the symbol $b$ is 7 may be considered as 9-aryl-9-aralkyl-10-oxodecanoic acids and those in which $b$ is 8 as 10-substituted-11-oxododecanoic acids. Similarly, as will be understood by those skilled in this art, when $R^1$ in Formula I is other than methyl, the aliphatic acid will be named to reflect the total number of linear aliphatic carbon atoms in the chain.

Some of the compounds of the invention have prostaglandin-like activity while others antagonize the action of natural prostaglandins. Thus, some mimic the effect of prostaglandin $E_1$ in stimulating smooth muscle, while others antagonize its smooth muscle-stimulating effects. Some of the compounds of this invention mimic the effects of prostaglandin $E_1$ in producing renal vasodilation and thus can be used as renal vasodilators. Also, certain compounds of this invention have antisecretory and bronchodilatory activity and thus can be used as anti-ulcer and anti-asthma agents. Because of their biological activity and ready accessibility, the compounds of the invention are also useful in that they permit large scale animal testing useful and necessary to understanding of these various disease conditions such as kidney impairment, ulcers, asthma, and the like. They are likewise of value as nasal decongestants. It will be appreciated that not all of the compounds of this invention have these biological activities to the same degree but the choice of any particular ones for any given purpose will depend upon several factors including the disease state to be treated.

When the compounds of this invention are used to treat human illnesses, they can be administered either topically or systemically (i.e., intraveneously, subcutaneously, intramuscularly, orally, rectally, by aerosolization, or in the form of sterile implants for long action).

Whatever the mode of administration, doses in the range of about 0.10 to 20 milligrams per kilogram of body weight per day are used. The exact dose depends on the age, weight, and condition of the patient, and the frequency and route of administration.

PROCESS OF THE INVENTION

The compounds of the invention are prepared from a 1-aryl-2-alkanone by a process that comprises sequentially replacing the two hydrogen atoms on the carbon atom alpha to the phenyl radical with (1) and aralkyl or aralkenyl radical and (2) and alkoxycarbonylalkyl radical wherein the alkyl moiety has from 6–8 carbons. Either of the two moieties may be introduced into the alkanone initially although it is preferred to react the 1-phenyl-2-alkanone first with an aralkyl or aralkenyl halide, and to treat the resulting product with the appropriate omega-haloalkanoic acid ester. The resulting ester is then hydrolyzed, if desired, to afford the free acid of formula I hereinabove. Alternatively, an omega-haloalkanonitrile may be used in place of the halo alkanoate, in which case the resulting nitrile is converted to the corresponding free acid by treatment with strong mineral acid.

In accordance with one process aspect of the invention, a 1-phenyl (or substituted phenyl)-2-alkanone of the formula:

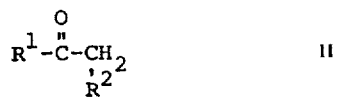

wherein $R^2$ is phenyl or substituted phenyl as defined in formula I, and $R^1$ is lower alkyl of 1–3 carbon atoms, included branched alkyl and cyclopropyl.

This compound is then treated with an equivalent of base such as an alkali metal hydride, amide, alkoxide, or hydroxide, e.g., sodium hydride, sodium amide, sodium ethoxide, potassium tert.-butoxide or potassium hydroxide. The enolate anion thus produced is then treated, preferably with either of the following two reagents:

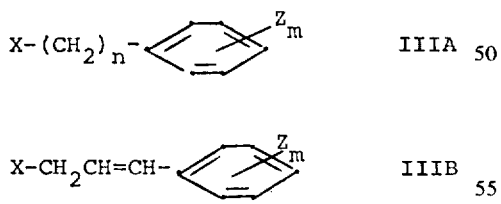

where X is halo, preferably chloro or bromo; Z is halo, loweralkyl of 1–4 carbon atoms, lower alkoxy of 1–4 carbon atoms, hydroxy, cyano, trifluoromethyl, hydroxymethyl, or loweralkanoyloxymethyl of 1–4 carbon atoms; n is odd number from 1–7 and m is 0–2.

The reaction of the anion from II with either compound IIIA or IIIB is conducted in an inert solvent or solvent system, such as dimethylformamide, dimethylformamide-benzene (1:1), glyme or diglyme, at a temperature ranging from 40°–120°C. The reactants are employed in approximately equimolar amounts; the reaction is complete in about ½ to 4 hours.

At the end of this reaction, the resulting diphenyl (or substituted phenyl) alkanone or alkenone is recovered by known techniques. In this fashion, for instance, phenylacetone is reacted with sodium hydride or sodium amide and the resulting product treated with benzyl chloride to afford 3,4-diphenyl-2-butanone.

The next reaction step involves treatment of the intermediate ketone with an equimolar amount of base such as alkali metal hydride, amide, or alkoxide, followed by reaction with an omega haloalkanoic acid ester having the formula:

$$X(CH_2)_bCOOY$$

IV wherein X is halogen, preferably chlorine or bromine; b is an integer from 6–8; and Y is a blocking hydrocarbyl radical, preferably a lower alkyl group having 1–5 carbon atoms, e.g., tert.-butyl or ethyl.

This reaction is preferably carried out in an inert solvent at a temperature of about 50°–100°C., using a slight molar excess of the haloalkanoate IV. There is thus produced an ester of the desired oxo-alkanoic acid having a phenyl (or substituted phenyl) and an aralkyl or aralkenyl radical on the carbon adjacent to the ketone. Utilizing this method a loweralkyl 8-benzyl-8-phenyl-9-oxodecanoate is obtained by reaction of 3,4-diphenyl-2-butanone with sodium hydride and treatment of the resulting enolate with a loweralkyl 7-bromoheptanoate. The corresponding free acids are obtained on alkaline hydrolysis of the alkanoic acid ester as with an alkali metal hydroxide, e.g., sodium or potassium hydroxide, preferably in a lower alkanol followed by acidification with a mineral acid such as hydrochloric acid. Salts of the free acid are readily produced by techniques known in the art such as by reaction of the free acid with an appropriate base.

This process described thereby yields compounds having the formula:

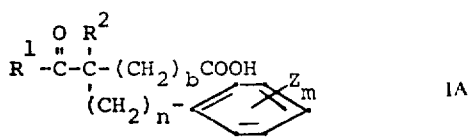

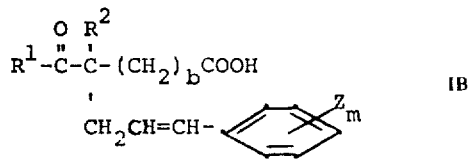

wherein $R^2$, $R^1$, Z, n, m, and b are as defined previously.

In place of the haloalkanoate IV, above, an omega-haloalkanonitrile IVB can be used:

$$X-(CH_2)_bCN$$

IVB wherein X and b are as defined in formula IV. When this compound is used, the reaction conditions are the same, except that the nitrile group is removed by acid hydrolysis to yield the desired free acid.

Derivatives of formula I wherein the carboxylic acid group is replaced by a tetrazolyl group can be prepared from the derivatives having the nitrile group on the -(CH$_2$)$_b$-side chain, i.e., from using the reagent IVB above. The nitrile-containing final intermediate is reacted with an alkali metal azide, preferably sodium azide and ammonium chloride, all in approximately equimolar amounts at a temperature between 60°–100°C. for 1–5 hours. Following acidification, the desired tetrazolyl derivative is recovered.

The free acid of compound I can be derivatized in a variety of ways to yield the various salt, esters, and amides of the acid. To obtain carboxy salts the acid products are dissolved in a solvent such as ethanol, methanol, glyme and the like and the solution treated wuth an appropriate alkali or alkaline earth hydroxide or alkoxide to yield the metal salt, or with an equivalent quantity of ammonia, amine or quaternary ammonium hydroxide to yield the amine salt. In each instance, the salt either separates from the solution and may be separated by filtration or, when the salt is soluble it may be recovered by evaporation of the solvent. Aqueous solutions of the carboxylic acid salts can be prepared by treating an aqueous suspension of the carboxylic acid with an equivalent amount of an alkaline earth hydroxide or oxide, alkali metal hydroxide, carbonate or bicarbonate, ammonia, an amine or a quaternary ammonium hydroxide.

To obtain carboxy esters, the acid products are treated in ether with an ethereal solution of the appropriate diazoalkane. For example, methyl esters are produced by reaction of the acid products with diazomethane. To obtain products wherein the acid derivative is carbamoyl, substituted carbamoyl, or carbazoyl, the acid product is first converted to an active Woodward ester. For example, the acid product can be made to react with N-tert.-butyl-5-methylisoxazolium perchlorate in acetonitrile in the presence of a base such as triethylamine to yield an active ester in which the acid derivative is

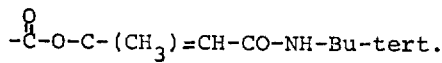

Active esters of this type can be reacted with ammonia to yield carbamoyl derivatives with primary or secondary amines or diloweralkylamino-alkylamines to yield substituted carbamoyl derivatives, and with hydrazine to yield carbazoyl derivatives.

This invention is further illustrated by the following examples.

EXAMPLE 1

8-Benzyl-8-Phenyl-9-Oxodecanoic Acid

Step A: 3,4-Diphenyl-2-butanone

Sodium amide (11.71 g., 0.3 mole) is suspended in benzene (300 ml.), and phenylacetone (40.25 g., 0.3 mole) is added dropwise while the temperature is kept below 20°C. The reaction mixture is stirred at room temperature for one hour, and benzyl chloride (37.97 g., 0.3 mole) is added dropwise while maintaining the temperature below 20°C. The resulting mixture is stirred overnight, poured into water (400 ml.), and the organic layer is separated and dried over anhydrous sodium sulfate. The solvent is removed in vacuo, and the residual oil is fractionally distilled to obtain 3,4-diphenyl-2-butanone (36.01 g., 0.16 mole, 53.3 percent yield, b.p. 109°–112°C./0.1mm.).

STEP B: Ethyl 8-Benzyl-8-Phenyl-9Oxodecanoate

Sodium hydride (4.3 g., 0.1 mole, 57 percent oil suspension) is suspended in a mixture of benzene (75 ml.) and dimethylformamide (DMF) (75 ml.), and 3,4-diphenyl-2-butanone (22.43g., 0.1 mole) is added dropwise. The resulting mixture is heated on a steam bath for 2 hours then cooled to room temperature. Ethyl 7-bromoheptanoate (26.09 g., 0.11 mole) is added dropwise, and the mixture is heated on a steam bath for 24 hours. The cooled reaction mixture is poured into water (500 ml.), extracted with ether, and the organic extracts dried over sodium sulfate. The solvent is removed in vacuo and the residual oil is distilled through a short-path system to obtain ethyl 8-benzyl-8-phenyl-9-oxodecanoate (16.35 g., 0.043 mole, 43 percent yield, b.p. 190°–196°C./0.1mm).

STEP C: 8-Benzyl-8-phenyl-9-oxodecanoic acid

A mixture of ethyl 8-benzyl-8-phenyl-9-oxodecanoate (15.22 g., 0.04 mole), sodium hydroxide (2.40 g., 0.06 mole), water (20 ml.), and methanol (180 ml.) is stirred for 24 hours. The methanol is removed in vacuo; the residual oil is poured into 6 N hydrochloric acid (200 ml.), extracted with ether, and the combined ether extracts are dried over anhydrous sodium sulfate. The ether is removed in vacuo, and the residual oil is chromatographed through a silica gel column to obtain pure 8-benzyl-8-phenyl-9-oxodecanoic acid (oil, 7.37 g., 0.026 mole, 65 percent yield), pmr CDCl$_3$) δ1.92 (S, 3H, CH$_3$CO), 6.40–7.50 (M, 10H, aromatic), 10.74 (S, broad, 1H, -COOH).

EXAMPLE 2

8-Phenyl-8-(3-Phenylpropyl)-9-Oxodecanoic Acid

STEP A: 3,6-Diphenyl-2-hexanone

Sodium hydride (8.6 g., 0.2 mole, 57 percent oil suspension) is suspended in a mixture of benzene (150 ml.) and DMF (150 ml.), and phenylacetone (26.83 g., 0.2 mole) is added dropwise. The resulting mixture is heated on a steam bath for 1 hour then cooled to room temperature. (3-Bromopropyl)benzene (39.82 g., 0.2 mole) is added dropwise and the mixture heated on a steam bath for 48 hours. The cooled reaction mixture is poured into water (750 ml.), extracted with ether and the combined organic extracts dried over anhydrous sodium sulfate. The solvent is removed in vacuo, and the residual oil is fractionally distilled to obtain 3,6-diphenyl-2-hexanone (25.37 g., 0.105 mole, 52.5 percent yield, b.p. 124°–127°C/0.05 mm).

STEP B: Ethyl 8-phenyl-8-(3-phenylpropyl)-9-oxodecanoate

Sodium hydride (4.3 g., 0.1 mole, 57 percent oil suspension) is suspended in a mixture of benzene (75 ml.) and DMF (75 ml.), and 3,6-diphenyl-2-hexanone (25.23 g., 0.1 mole) is added dropwise. The resulting mixture is heated on a steam bath for one hour then cooled to room temperature. Ethyl 7-bromoheptanoate (26.09 g., 0.11 mole) is added dropwise and the mixture heated on a steam bath for 24 hours. The cooled reaction mixture is poured into water (500 ml.), extracted with ether, and the combined organic extracts dried over anhydrous sodium sulfate. The solvent is removed in vacuo, and the residual oil is distilled through a shortpath system to obtain ethyl 8-phenyl-8-(3-phenylpropyl)-9-oxodecanoate (13.85 g., 0.035 mole, 35% yield, b.p. 209°–214°C./0.1 mm.).

STEP C: 8-Phenyl-8-(3-phenylpropyl)-9-oxodecanoic acid

A mixture of ethyl 8-phenyl-8-(3-Phenylpropyl)-9-oxodecanoate (12.26 g., 0.03 mole), sodium hydroxide (1.80 g., 0.045 mole), water (20 ml.), and methanol (180 ml.) is stirred for twenty-four hours. The methanol is removed in vacuo; the residual oil is poured into 6N hydrochloric acid (150 ml.), extracted with ether, and the combined ether extracts dried over anhydrous sodium sulfate. The ether is removed in vacuo, and the residual oil is chromatographed through a silica gel column to obtain pure 8-phenyl-8-(3-phenylpropyl)-9-oxodecanoic acid (oil, 5.14 g., 0.0135 moles, 45 percent yield); pmr (CDCl$_3$) $\delta$1.78 (S, 3H, CH$_3$CO), 6.90–7.50 (M, 10H, aromatic), 10.08 (S, broad, 1H, -COOH).

EXAMPLE 3

10-(o-Chlorobenzyl)-10-Phenyl-11-Oxododecanoic Acid

A stirred suspension of sodium hydride (720 mg., 0.03 mole) in a mixture of benzene (40 ml) and DMF (50 ml.) in an inert atmosphere is warmed to 60°C. and treated dropwise over a 30 minute period with 3-phenyl-4-(o-chlorophenyl)-2-butanone (7.8 grams, 0.03 mole). The reaction mixture is then refluxed for 30 minutes, cooled to 25°C. and treated with ethyl 9-bromononanoate (8 grams, 0.03 mole). The mixture is refluxed for one hour and then poured into ice water (300 ml.) containing hydrochloric acid (5 ml.). The ethyl ester of 10-(o-chlorobenzyl)-10-phenyl-11oxododecanoic acid thus obtained is extracted into ether, the ether extract washed with water, dried over magnesium sulfate, and the ether removed by distillation. The residual ester is hydrolyzed in a mixture of methanol (60 ml.), water (6 ml.) and sodium hydroxide (0.9 g.) at 25°C. for 18 hours. 40 Ml. of methanol is then removed by distillation and the red residual solution treated with dilute aqueous hydrochloric acid. The resulting 10-(o-chlorobenzyl)-10-phenyl-11-oxododecanoic acid is purified by column chromatography on silica gel to afford 5.5 grams (44 percent) of the desired product as a viscous oil (pmr (CDCl$_3$), $\delta$1.95 (S, 3H, CH$_3$C=O), 6.7–7.5 (M, 9H, aromatic), 9.0 (S, 1H, CO$_2$H).

EXAMPLE 4

8-Cinnamyl-8-Phenyl-9-Oxodecanoic Acid

STEP A: 3,6-Diphenyl-5-hexen-2-one

Sodium hydride (12.9 g., 0.3 mole, 57 percent oil suspension) is suspended in a mixture of benzene (200 ml.) and DMF (200 Ml.) and phenylacetone (40.25 g., 0.3 mole) is added dropwise. The resulting mixture is heated on a steam bath for one hour then cooled to room temperature. Cinnamyl chloride (45.79 g., 0.3 mole) is added dropwise, and the mixture is heated on a steam bath for 24 hours. The cooled reaction mixture is poured into water (1,000 ml.), extracted with ether, and the organic extracts dried over anhydrous sodium sulfate. The solvent is removed in vacuo, and the residual oil is fractionally distilled to obtain 3,6-diphenyl-5-hexen-2-one (44.14 g., 0.176 mole, 58.7 percent yield, b.p. 131°–136°C./0.05 mm).

STEP B: Ethyl 8-cinnamyl-8-phenyl-9-oxodecanoate

Sodium hydride (4.3 g., 0.1 mole, 57 percent oil suspension) is suspended in a mixture of benzene (75 ml.) and DMF (75 ml.), and 3,6-diphenyl-5-hexen-2-one (25.03 g., 0.1 mole) is added dropwise. The resulting mixture is heated on a steam bath for one hour then cooled to room temperature. Ethyl 7-bromoheptanoate (26.09 g., 0.11 mole) is added dropwise and the mixture is heated on a steam bath for 24 hours. The cooled reaction mixture is poured into water (500 ml.), extracted with ether, and the organic extracts dried over sodium sulfate. The solvent is removed in vacuo, and the residual oil is distilled through a short-path system to obtain ethyl 8-cinnamyl-8-phenyl-9-oxodecanoate (9.46 g., 0.023 mole, 23 percent yield, b.p. 218°–230°C./0.2 mm – 0.3 mm).

STEP C: 8-Cinnamyl-8-phenyl-9-oxodecanoic acid

A mixture of ethyl 8-cinnamyl-8-phenyl-9-oxodecanoate (8.13 g., 0.02 mole), sodium hydroxide (1.20 g., 0.03 mole), water (15 ml.), and methanol (135 ml.) is stirred for twenty-four hours. The methanol is removed in vacuo; the residual oil is poured into 6N hydrochloric acid (150 ml.), extracted with ether, and the combined ether extracts dried over anhydrous sodium sulfate. The ether is removed in vacuo, and the residual oil is chromatographed through a silica gel column to obtain the product as an oil. This oil is triturated in a mixture of ether (25 ml.) and hexane (150 ml.) to obtain 8-cinnamyl-8-phenyl-9-oxodecanoic acid as a white solid (1.7 g., 0.0045 mole, 22.5 percent yield, m.p. 89°–91°C.). Recrystallization from hexane yields a white crystalline solid, 1.35 g., m.p. 91°–93°C.

EXAMPLE 5

8-(m-Chlorobenzyl)-8-Phenyl-9-Oxodecanoic Acid

STEP A: 3-Phenyl-4-(m-chlorophenyl)-2-butanone

3-Phenyl-4-(m-chlorophenyl)-2-butanone is prepared following substantially the same procedure described in Example 4, Step A except that m-chlorobenzyl chloride (48.31 g., 0.3 mole) is substituted for cinnamyl chloride.

The procedure gives 42.92 g. (0.166 mole, 55 percent yield, b.p. 125°–127°C./0.1 mm) of 3-phenyl-4-(m-chlorophenyl)-2-butanone.

STEP B: Ethyl 8-(m-chlorobenzyl)-8-phenyl-9-oxodecanoate

Ethyl 8-(m-chlorobenzyl)-8-phenyl-9-oxodecanoate is prepared following substantially the same procedure described in Example 4, Step B, except that 3-phenyl-4-(m-chlorophenyl)-2-butanone (25.87 g., 0.1 mole) is substituted for 3,6-diphenyl-5-hexen-2-one.

The procedure gives 20.48 g. (0.049 mole, 49 percent yield, b.p. 200°–210°C./0.1 mm.) of ethyl 8-(m-chlorobenzyl)-8-phenyl-9-oxodecanoate.

STEP C: 8-(m-Chlorobenzyl)-8-phenyl-9-oxodecanoic acid

A mixture of ethyl 8-(m-chlorobenzyl)-8-phenyl-9-oxodecanoate (16.60 g., 0.04 mole), sodium hydroxide (2.40 g., 0.06 mole), water (20 ml.), and methanol (180 ml.) is stirred for 24 hours. The methanol is removed in vacuo; the residual oil is poured into 6N hydrochloric acid (150 ml.), extracted with ether and the combined ether extracts dried over anhydrous sodium sulfate. The ether is removed in vacuo, and the residual oil is chromatographed through a silica gel column to obtain 8-(m-chlorobenzyl)-8-phenyl-9-oxodecanoic acid as an oil. This oil is triturated in a mixture of ether (10 ml.) and hexane (150 ml.) to obtain 8-(m-chlorobenzyl)-8-phenyl-9-oxodecanoic acid as a white solid (5.7 g., 0.0147 mole, 38 percent yield, m.p.

69°–71°C.). Recrystallization from hexane yields the product as a white crystalline solid, 3.92 g., m.p. 70°–71°C.

EXAMPLE 6

8-(o-Methylbenzyl)-8-Phenyl-9-Oxodecanoic Acid

STEP A: 3-Phenyl-4-(o-methylphenyl)-2-butanone

3-Phenyl-4-(o-methylphenyl)-2-butanone is prepared following substantially the same procedure described in Example 4, Step A, except that o-methylbenzyl bromide (55.52 g., 0.3 mole) is substituted for cinnamyl chloride. The procedure gives 36.33 g. (0.153 mole, 51 percent yield, b.p. 116°–120°C./0.1 mm) of 3-phenyl-4-(o-methylphenyl)-2-butanone.

STEP B: Ethyl 8-(o-methylbenzyl)-8-phenyl-9-oxodecanoate

Ethyl 8-(o-methylbenzyl)-8-phenyl-9-oxodecanoate is prepared following substantially the same procedure described in Example 4, Step B, except that 3-phenyl-4-(o-methylphenyl)-2-butanone (23.83 g., 0.1 mole) is substituted for 3,6-diphenyl-5-hexen-2-one.

The procedure gives 15.63 g. (0.04 mole, 40 percent yield, b.p. 197°–203°C./0.15 mm) of ethyl 8-(o-methylbenzyl-8-phenyl-9-oxodecanoate.

STEP C: 8-(o-Methylbenzyl)-8-phenyl-9-oxodecanoic acid

A mixture of ethyl 8-(o-methylbenzyl)-8-phenyl-9-oxodecanoate (15.63 g., 0.04 mole), sodium hydroxide (2.40 g., 0.06 mole), water (20 ml.), methanol (180 ml.) is stirred for twenty-four hours. The methanol is removed in vacuo; the residual oil is poured into 6N hydrochloric acid (150 ml.), extracted with ether, and the combined ether extracts dried over anhydrous sodium sulfate. The ether is removed in vacuo, and the residual oil is chromatographed through a silica gel column to obtain pure 8-(o-methylbenzyl)-8-phenyl-9-oxodecanoic acid as an oil (4.09 g., 0.011 mole, 27.5 percent yield); pmr (CDCl$_3$) δ1.97 (S, 3H, CH$_3$CO), 6.60–7.40 (M, 9H, aromatic), 10.36 (S, broad, 1H, -COOH).

EXAMPLE 7

8-(p-Chlorobenzyl)-8-Phenyl-9-Oxodecanoic Acid

STEP A: 3-Phenyl-4-(p-chlorophenyl)-2-butanone

Sodium hydride (12.9 g., 0.3 mole, 57 percent oil suspension) is suspended in a mixture of benzene (200 ml.) and DMF (200 ml.), and phenylacetone (40.25 g., 0.3 mole) is added dropwise. The resulting mixture is heated on a steam bath for one hour then cooled to room temperature. p-Chlorobenzyl chloride (48.31 g., 0.3 mole) in benzene (50 ml.) is added dropwise and the mixture is heated on a steam bath for 24 hours. The cooled reaction mixture is poured into water (800 ml.), extracted with ether, and the organic extracts dried over anhydrous sodium sulfate. The solvent is removed in vacuo, and the residual oil is triturated with hexane to obtain the product as a yellow solid, 37.45 g. (0.145 mole), 48.3 percent yield, m.p. 77°–79.5°C. Recrystallization from hexane yields 3-phenyl-4-(p-chlorophenyl)-2-butanone in the form of pale yellow crystals, 32.89 g., m.p. 78.5°–80°C.

STEP B: Ethyl 8-(p-chlorobenzyl)-8-phenyl-9-oxodecanoate

Ethyl 8-(p-chlorobenzyl)-8-phenyl-9-oxodecanoate is prepared following substantially the same procedure described in Example 4, Step B, except that 3-phenyl-4-(p-chlorophenyl)-2-butanone (25.87 g., 0.1 mole) is substituted for 3,6-diphenyl-5-hexen-2-one.

The procedure gives 22.64 g. (0.0546 mole, 54.6 percent yield, b.p. 217°–223°C/0.35 mm.) of ethyl 8-(p-chlorobenzyl)-8-phenyl-9-oxodecanoate.

STEP C: 8-(p-Chlorobenzyl)-8-phenyl-9-oxodecanoic acid

A mixture of ethyl 8-(p-chlorobenzyl)-8-phenyl-9-oxodecanoate (16.60 g., 0.04 mole), sodium hydroxide (2.40 g., 0.06 mole), water (20 ml.), and methanol (180 ml.) is stirred for twenty-four hours. The methanol is removed in vacuo; the residual oil is poured into 6N hydrochloric acid (150 ml.), extracted with ether, and the combined ether extracts dried over anhydrous sodium sulfate. The ether is removed in vacuo and the residual oil is triturated with petroleum ether to obtain 8-(p-chlorobenzyl)-8-phenyl-9-oxodecanoic acid as a white solid, 11.1 g.(0.029 mole), 72.5 percent yield, m.p. 105°–112°C. Recrystallization from hexane yields the product as a white crystalline solid, m.p. 113.5°–117°C.

EXAMPLE 8

8-(2,4-Dichlorobenzyl)-8-Phenyl-9-Oxodecanoic Acid

STEP A: 3-Phenyl-4-(2,4-dichlorophenyl)-2-butanone

3-Phenyl-4-(2,4-dichlorophenyl)-2-butanone is prepared following substantially the same procedure described in Example 4, Step A, except that 2,4-dichlorobenzyl chloride (58.64 g., 0.3 mole) is substituted for cinnamyl chloride.

The procedure gives 49.04 g. (0.167 mole, 56 percent yield, b.p. 128°–133°C./0.1 mm., m.p. 66°–69°C.) of 3-phenyl-4-(2,4-dichlorophenyl)-2-butanone.

STEP B: Ethyl 8-(2,4-dichlorobenzyl)-8-phenyl-9-oxodecanoate

Ethyl 8-(2,4-dichlorobenzyl)-8-phenyl-9-oxodecanoate is prepared following substantially the same procedure described in Example 4, Step B, except that 3-phenyl-4-(2,4-dichlorophenyl)-2-butanone (29.32 g., 0.1 mole) is substituted for 3,6-diphenyl-5-hexen-2-one.

The procedure gives 20.74 g. (0.046 mole, 46 percent yield, b.p. 214°–223°C./0.2 mm.) of ethyl 8-(2,4-dichlorobenzyl)-8-phenyl-9-oxodecanoate.

STEP C: 8-(2,4-Dichlorobenzyl)-8-phenyl-9-oxodecanoic acid

A mixture of ethyl 8-(2,4-dichlorobenzyl)-8-phenyl-9-oxodecanoate (17.98 g., 0.04 mole), sodium hydroxide (2.40 g., 0.06 mole), water (20 ml.), and the methanol (180 ml.) is stirred for twenty-four hours. The methanol is removed in vacuo. The residual oil is poured into 6N hydrochloric acid (150 ml.) extracted with ether, and the combined ether extracts dried over anhydrous sodium sulfate. The ether is removed in vacuo, and the residual oil is chromatographed through a silica gel column to obtain 8-(2,4-dichlorobenzyl)-8-phenyl-9-oxodecanoic acid as an oil. This oil is triturated with hexane (150 ml.) to obtain the product as a white solid, 6.43 g., 0.0153 mole, 36 percent yield. Recrystallization from hexane yields 8-(2,4-dichlorobenzyl)-8-phenyl-9-oxodecanoic acid as a white crystalline solid, 5.80 g., m.p. 97°–99°C.

EXAMPLE 9

8-(3,4-Dichlorobenzyl)-8-Phenyl-9-Oxodecanoic Acid

STEP A: 3-Phenyl-4-(3,4-dichlorophenyl)-2-butanone

3-Phenyl-4-(3,4-dichlorophenyl)-2-butanone is prepared following substantially the same procedure described in Example 5, Step A, except that 3,4-dichlorobenzyl chloride (58.64 g., 0.3 mole) is substituted for cinnamyl chloride.

The procedure gives 53.68 g. (0.183 mole, 61 percent yield, b.p. 140°–145°C./0.1 mm.) of 3-phenyl-4-(3,4-dichlorophenyl)-2-butanone.

STEP B: Ethyl 8-(3,4-dichlorobenzyl)-8-phenyl-9-oxodecanoate

Ethyl 8-(3,4-dichlorobenzyl)-8-phenyl-9-oxodecanoate is prepared following substantially the same procedure described in Example 4, Step B, except that 3-phenyl-4-(3,4-dichlorophenyl)-2-butanone (29.32 g., 0.1 mole) is substituted for 3,6-diphenyl-5-hexen-2-one.

The procedure gives 20.54 g. (0.0457 mole, 45.7 percent yield, b.p. 215°–222°C./0.15 mm.) of ethyl 8-(3,4-dichlorobenzyl)-8-phenyl-9-oxodecanoate.

STEP C: 8-(3,4-Dichlorobenzyl)-8-phenyl-9-oxodecanoic acid

A mixture of ethyl 8-(3,4-dichlorobenzyl)-8-phenyl-9-oxodecanoate (17.98 g., 0.04 mole), sodium hydroxide (2.40 g., 0.06 mole), water (20 ml.), and methanol (180 ml.) is stirred for twenty-four hours. The methanol is removed in vacuo; the residual oil is poured into 6N hydrochloric acid (150 ml.), extracted with ether, and the combined ether extracts dried over anhydrous sodium sulfate. The other is removed in vacuo, and the residual oil is triturated with hexane (200 ml.) to obtain 8-(3,4-dichlorobenzyl)-8-phenyl-9-oxodecanoic acid as a white solid, 11.85 g., 0.0281 mole, 70.2 percent yield, m.p. 92°C–99°C. Recrystallization from hexane yields 8.5 g., m.p. 97.5°–102°C.

EXAMPLE 10

8-(2,6-Dichlorobenzyl)-8-Phenyl-9-Oxodecanoic Acid

STEP A: 3-Phenyl-4-(2,6-dichlorophenyl)-2-butanone

Sodium hydride (12.9 g., 0.3 mole, 57 percent oil suspension) is suspended in a mixture of benzene (200 ml.) and DMF (200 ml.), and phenylacetone (40.25 g., 0.3 mole) is added dropwise. The resulting mixture is heated on a steaam bath for one hour then cooled to room temperature. 2,6-Dichlorobenzyl chloride (58.64 g., 0.3 mole) is added dropwise, and the mixture is heated on a steam bath for twenty-four hours. The cooled reaction mixture is poured into water (1,000 ml.), extracted with ether, and the organic extracts dried over anhydrous sodium sulfate. The solvent is removed in vacuo, and the residual oil is triturated with petroleum ether (150 ml.) to obtain 3-phenyl-4-(2,6-dichlorophenyl)-2-butanone as a white solid, 46.0 g., 0.157 mole, 52.3 percent yield, m.p. 68°–70.5°C. Recrystallization from hexane yields 40.05 g., m.p. 68°–70.5°C.

STEP B: Ethyl 8-(2,6-dichlorobenzyl)-8-phenyl-9-oxodecanoate

Ethyl 8-(2,6-dichlorobenzyl)-8-phenyl-9-oxodecanoate is prepared following substantially the same procedure described in Example 4, Step B, except that 3-phenyl-4-(2,6-dichlorophenyl)-2-butanone (29.32 g., 0.1 mole) is substituted for 3,6-diphenyl-5-hexen-2-one.

The procedure gives 10.53 g., 23.4 percent yield, b.p. 220°–233°C./0.3 mm. of ethyl 8-(2,6-dichlorobenzyl)-8-phenyl-9-oxodecanoate.

STEP C: 8-(2,6-Dichlorobenzyl)-8-phenyl-9-oxodecanoic acid

A mixture of ethyl 8-(2,6-dichlorobenzyl)-8-phenyl-9-oxodecanoate (9.0 g., 0.02 mole), sodium hydroxide (1.20 g., 0.03 mole), water (10 ml.), and methanol (90 ml.) is stirred for twenty-four hours. The methanol is removed in vacuo and the residual oil is poured into hydrochloric acid (100 ml.), extracted with ether, and the combined ether extracts dried over anhydrous sodium sulfate. The ether is removed in vacuo; the residual oil is chromatographed through a silica gel column to obtain a yellow oil. This oil is triturated in a mixture of hexane (50 ml.) and butyl chloride (10 ml.) to obtain 8-(2,6-dichlorobenzyl)-8-phenyl-9-oxodecanoic acid as a tan solid. Recrystallization from hexane yields the product as a white crystalline solid, 250 mg., m.p. 97.5°–100°C.

EXAMPLE 11

8-(p-Methylcinnamyl)-8-Phenyl-9-Oxodecanoic Acid

STEP A: 6-(p-Methylphenyl)-3-phenyl-5-hexen-2-one

Following the procedure of Example 4, Step A, where p-methylcinnamyl bromide is substituted for cinnamyl chloride there is obtained 6-(p-methylphenyl)-3-phenyl-5-hexen-2-one, b.p. 136°–137°C./0.06 mm.

STEP B: Ethyl 8-(p-methylcinnamyl)-8-phenyl-9-oxodecanoate

Following the procedure of Example 4, Step B, using 6-(p-methylphenyl)-3-phenyl-5-hexen-2-one (20 g., 0.076 mole), sodium hydride (3.17 g., 0.076 mole, oil dispersion), ethyl 7-bromoheptanoate (19 g., 0.08 mole), benzene (100 ml.), and DMF (100 ml.) there is obtained 26.5 g. of crude ethyl 8-(p-methylcinnamyl)-8-phenyl-9-oxodecanoate after removal of volatiles.

STEP C: 8-(p-Methylcinnamyl)-8-phenyl-9-oxodecanoic acid

A mixture of ethyl 8-(p-methylcinnamyl)-8-phenyl-9-oxodecanoate (26.5 g., crude), sodium hydroxide (5.2 g., 0.13 mole), water (20 ml.), and methanol (180 ml.) is stirred under nitrogen for 24 hours. The methanol is removed in vacuo and the residue treated with water (500 ml.) and acidified with 6N hydrochloric acid. The taffy-like material is extracted into ether (400 ml.), washed, and dried (Na$_2$SO$_4$). The ether is removed under reduced pressure and the residue is chromatographed on a silica gel column packed and eluted with chloroform. There is obtained 9.49 g., of 8-(p-methylcinnamyl)-8-phenyl-9-oxodecanoic acid, m.p. 106.5°–109.5°C. Recrystallization from cyclohexane gives material with m.p. 109.5°–111°C.

EXAMPLE 12

8-(o-Methylcinnamyl)-8-Phenyl-9-Oxodecanoic Acid

STEP A: 1-(o-Methylphenyl)-2-propen-1-ol o-Bromotoluene (85.5 g., 0.5 mole) is converted to o-methylphenyl-magnesium bromide by reaction with magnesium turnings (12.6 g., 0.52 mole) in ether (500 ml.). The solution is cooled to −10°C. and a solution of acrolein (28 g., 0.5 mole) in ether (100 ml.) is added dropwise. After an additional hour without regard to bath temperature, saturated aqueous ammonium chloride (100 ml.) is added and stirring continued an additional hour. The ether is decanted from inorganic salts, combined with further washings of the salts with ether and dried (K$_2$CO$_3$). The dried ether solution is concentrated under reduced pressure to a yellowish oil. Vacuum distillation gives 42.94 g. (58 percent) of 1-(o- methylphenyl)-2-propen-1-ol, b.p. 119°-122°C./16 mm.

STEP B: o-Methylcinnamyl bromide

Dry hydrogen bromide gas is introduced into a solution of 1-(o-methylphenyl)-2-propen-1-ol (42.9 g., 0.29 mole) in ether (200 ml.) for 2 hours. The solution is dried (MgSO$_4$) and concentrated to a reddish-orange oil (54.2 g.) under reduced pressure. Distillation gives a 36.17 g. (60 percent) yield of o-methylcinnamyl bromide, b.p. 139°-142°C./16 mm.

STEP C: 6-(o-Methylphenyl)-3-phenyl-5-hexen-2-one

Following the procedure of Example 4, Step A, where o-methylcinnamyl bromide is substituted for cinnamyl chloride there is obtained 6-(o-methylphenyl)-3-phenyl-5-hexen-2-one, m.p. 76°-78°C.

STEP D: Ethyl 8-(o-methylcinnamyl)-8-phenyl-9-oxodecanoate

Following the procedure of Example 4, Step B, using 6-(o-methylphenyl)-3-phenyl-5-hexen-2-one (20 g., 0.076 mole), sodium hydride (3.17 g., 0.076 mole, oil dispersion), ethyl 7-bromoheptanoate (19 g., 0.08 mole), benzene (100 ml.), and DMF (100 ml.), ethyl 8-(o-methylcinnamyl)-8-phenyl-9-oxodecanoate is obtained as a yellowish oil.

STEP E: 8-(o-Methylcinnamyl)-8-phenyl-9-oxodecanoic acid

A mixture of the crude ethyl 8-(o-methylcinnamyl)-8-phenyl-9-oxodecanoate (from Step D), sodium hydroxide (6 g., 0.15 mole), water (20 ml.), and methanol (180 ml.) is stirred for 24 hours. The methanol is removed in vacuo and the residue treated with water (500 ml.) and acidified with 6N hydrochloric acid. The gummy material is extracted into ether (500 ml.), the ether extract washed with water and dried (Na$_2$SO$_4$). The ether is removed under reduced pressure and the residue is chromatographed on a silica gel column packed and eluted with chloroform. There is obtained 1.95 g. of 8-(o-methylcinnamyl)-8-phenyl-9-oxodecanoic acid, m.p. 73°-76°C. Recrystallization (ether–petroleum ether) produces no change in melting point.

EXAMPLE 13

8-(m-Chlorocinnamyl)-8-Phenyl-9-Oxodecanoic Acid

STEP A: 3-Phenyl-6-(m-chlorophenyl)-5-hexen-2-one

3-Phenyl-6-(m-chlorophenyl)-5-hexen-2-one is prepared following the procedure described in Example 4, Step A, where m-chlorocinnamyl bromide (46.31 g., 0.2 mole) is substituted for cinnamyl chloride.

The above procedure gives 35.06 g. (0.123 mole, 61.5 percent yield, b.p. 151°-153°C./0.1 mm.) of 3-phenyl-6-(m-chlorophenyl)-5-hexen-2-one.

STEP B: Ethyl 8-(m-chlorocinnamyl)-8-phenyl-9-oxodecanoate

Ethyl 8-(m-chlorocinnamyl)-8-phenyl-9-oxodecanoate is prepared following the procedure described in Example 4, Step B, where 3-phenyl-6-(m-chlorophenyl)-5-hexen-2-one (28.48 g., 0.1 mole) is substituted for 3,6-diphenyl-5-hexen-2-one.

STEP C: 8-(m-Chlorocinnamyl)-8-phenyl-9-oxodecanoic acid

A mixture of crude ethyl 8-(m-chlorocinnamyl)-8-phenyl-9-oxodecanoate (41.30 g.), NaOH (8.0 g., 0.2 mole), water (40 ml.), and methanol (360 ml.) is stirred for 24 hours. The methanol is removed in vacuo; the residual oil is poured into 6N HCl (200 ml.), extracted with ether, and the combined ether extracts dried over anhydrous Na$_2$SO$_4$. The ether is removed in vacuo, and the residual oil is chromatographed through a silica gel column to obtain 8-(m-chlorocinnamyl)-8-phenyl-9-oxodecanoic acid as an oil. This oil is triturated in a mixture of hexane (150 ml.) and ether (15 ml.) to obtain the product as a white solid (2.26 g. m.p. 90°-101°C.). Recrystallization from hexane, followed by recrystallization from cyclohexane yields the product as a white crystalline solid, 1.15 g., m.p. 104°-106.5°C.

EXAMPLE 14

8-(m-Methylcinnamyl)-8-Phenyl-9-Oxodecanoic Acid

STEP A: 3-Phenyl-6-(m-methylphenyl)-5-hexen-2-one

3-Phenyl-6-(m-methylphenyl)-5-hexen-2-one is prepared following the procedure described in Example 4, Step A, with m-methylcinnamyl bromide (29.56 g., 0.14 mole) substituted for cinnamyl chloride.

The above procedure gives 25.33 g. of 3-phenyl-6-(m-methylphenyl)-5-hexen-2-one (0.096 mole, 68.6 percent yield, b.p. 140°-143°C./0.1 mm.).

STEP B: Ethyl 8-(m-methylcinnamyl)-8-phenyl-9-oxodecanoate

Ethyl 8-(m-methylcinnamyl)-8-phenyl-9-oxodecanoate is prepared following the procedure described in Example 4, Step B, where 3-phenyl-6-(m-methylphenyl)5-hexen-2-one (23.79 g., 0.09 mole) is substituted for 3,6-diphenyl-5-hexen-2-one.

STEP C: 8-(m-Methylcinnamyl)-8-phenyl-9-oxodecanoic acid

A mixture of crude ethyl 8-(m-methylcinnamyl)-8-phenyl-9-oxodecanoate (37.74 g.), NaOH (8.0 g., 0.2 mole), water (40 ml.) and methanol (360 ml.) is stirred for 24 hours. The methanol is removed in vacuo; the residual oil is poured into 6N HCl (300 ml.), extracted with ether, and the combined ether extracts dried over anhydrous Na$_2$SO$_4$. The ether is removed in vacuo, and the residual oil is triturated with hexane (400 ml.) to obtain 8-(m-methylcinnamyl)-8-phenyl-9-oxodecanoic acid as a sticky light yellow solid (15.0 g.). Several recrystallizations from hexane, followed by a final recrystallization from cyclohexane yields the product as a white crystalline solid. 2.65 g., m.p. 94.5°-96.5°C.

EXAMPLE 15

8-(p-Cyanobenzyl)-8-Phenyl-9-Oxodecanoic Acid

STEP A: 3-Phenyl-4-(p-cyanophenyl)-2-butanone

Sodium hydride (6.45 g., 0.15 mole, 57 percent oil suspension) is suspended in a mixture of benzene (150 ml.) and DMF (150 ml.) and phenylacetone (20.13 g., 0.15 mole) is added dropwise. The resukting mixture is heated on a steam bath for 1 hour then cooled to room temperature. p-Cyanobenzyl chloride (22.74g., 0.15 mole) is added dropwise, and the mixture is heated for 24 hours. The cooled reaction mixture is poured into water (700 ml.), extracted with ether, and the organic extracts dried over anhydrous sodium sulfate. The solvent is removed in vacuo, and 3-phenyl-4-(p-cyanophenyl)-2-butanone is obtained as a yellow solid (31.0 g., 0.125 mole, 83.3 percent yield, m.p. 95°-105°C.). Recrystallization from cyclohexane yields 26.7 g., m.p. 105°-108.5°C.

STEP B: Ethyl 8-(p-cyanobenzyl)-8-phenyl-9-oxodecanoate

Ethyl 8-(p-cyanobenzyl)-8-phenyl-9-oxodecanoate is prepared following substantially the same procedure as described in Example 4, Step B, except that 3-phenyl-4-(p-cyanophenyl)-2-butanone (24.93 g., 0.1 mole) is substituted for 3,6-diphenyl-5-hexen-2-one.

The procedure yield 12.42 g. (0.031 mole, 31 percent yield, b.p. 230°–239°C./0.1 mm.) of ethyl 8-(p-cyanobenzyl)-8-phenyl-9-oxodecanoate.

STEP C: 8-(p-Cyanobenzyl)-8-phenyl-9-oxodecanoic acid

A mixture of ethyl 8-(p-cyanobenzyl)-8-phenyl-9-oxodecanoate (12.17 g., 0.03 mole), sodium hydroxide (1.80 g., 0.045 mole), water (20 ml.), and methanol (180 ml.) is stirred for 24 hours. The methanol is removed in vacuo; the residual oil is poured into 6N hydrochloric acid (150 ml.), extracted with ether, and the combined ether extracts dried over anhydrous sodium sulfate. The ether is removed in vacuo, and the residual oil is triturated in a mixture of petroleum ether (150 ml.) and 1-chlorobutane (25 ml.) to obtain 8-(p-cyanobenzyl)-8-phenyl-9-oxodecanoic acid as a white solid, 8.02 g., 0.021 mole, 70 percent yield, m.p. 111°–118.5°C. Recrystallization from methylcyclohexane, followed by 1-chlorobutane yields the product as a white crystalline solid, 3.58 g., m.p. 122°–124°C.

EXAMPLE 16

8-(m-Methoxybenzyl)-8-Phenyl-9-Oxodecanoic Acid

STEP A: m-Methoxybenzyl bromide

Dry hydrogen bromide gas is passed into a chilled solution of m-methoxybenzyl alcohol (40.10 g., 0.29 mole) in benzene (100 ml.) for two hours. The benzene solution containing m-methoxybenzyl bromide is separated from the water layer that forms, and is dried over anhydrous calcium chloride.

STEP B: 3-Phenyl-4-(m-methoxyphenyl)-2-butanone

Sodium hydride (12.47 g., 0.29 mole, 57% oil suspension) is suspended in a mixture of benzene (200 ml.) and DMF (200 ml.), and phenylacetone (38.91 g., 0.29 mole) is added dropwise. The resulting mixture is heated on a steam bath for 1 hour, then cooled to room temperature. The dried solution from Step A (containing m-methoxybenzyl bromide) is added dropwise, and the mixture is heated for 24 hours. The cooled reaction mixture is poured into water (750 ml.), extracted with ether, and the combined ether extracts dried over anhydrous sodium sulfate. The ether is removed in vacuo, and the residual oil is fractionally distilled to obtain 3-phenyl-4-(m-methoxyphenyl)-2-butanone (34.18 g., 0.135 mole, 46.6 percent yield, b.p. 130°–135°C./0.05 mm.).

STEP C: Ethyl 8-(m-methoxybenzyl)-8-phenyl-9-oxodecanoate

Ethyl 8-(m-methoxybenzyl)-8-phenyl-9-oxodecanoate is prepared following substantially the same procedure as described in Example 4, Step B, except that 3-phenyl-4-(m-methoxyphenyl)-2-butanone (25.43 g., 0.1 mole) is substituted for 3,6-diphenyl-5-hexen-2-one.

The procedure yields 14.16 g. (0.0345 mole, 34.5 percent yield, b.p. 212°–218°C./0.2 mm.) of ethyl 8-(m-methoxybenzyl)-8-phenyl-9-oxodecanoate.

STEP D: 8-(m-Methoxybenzyl)-8-phenyl-9-oxodecanoic acid

A mixture of ethyl 8-(m-methoxybenzyl)-8-phenyl-9-oxodecanoate (12.32 g., 0.03 mole), sodium hydroxide (1.80 g., 0.045 mole), water (20 ml.), and methanol is stirred for 24 hours. The methanol is removed in vacuo, the residual oil is poured into 6N hydrochloric acid (150 ml.), extracted with ether, and the combined ether extracts dried over anhydrous sodium sulfate. The ether is removed in vacuo, and the residual oil is chromatographed through a silica gel column to obtain pure 8-(m-methoxybenzyl)-8-phenyl-9-oxodecanoic acid (oil, 6.56 g., 0.017 mole, 57 percent yield); pmr (CDCl$_3$) δ1.92 (S, 3H, CH$_3$CO), 5.90-7.50 (M, 9H, aromatic), 10.20 (S, broad, 1H, -COOH).

EXAMPLE 17

8-(o-Methoxybenzyl)-8-Phenyl-9-Oxodecanoic Acid

STEP A: o-Methoxybenzyl bromide

Dry hydrogen bromide gas is passed into a chilled solution of o-methoxybenzyl alcohol (40.10 g., 0.29 mole) in benzene (100 ml.) for 2 hours. The benzene solution containing o-methoxybenzyl bromide is separated from the water layer that forms, and is dried over anhydrous calcium chloride.

STEP B: 3-Phenyl-4-(o-methoxyphenyl)-2-butanone

3-Phenyl-4-(o-methoxyphenyl)-2-butanone is prepared following substantially the same procedure as described in Example 16, Step B, except that the dried solution from Step A (containing o-methoxybenzyl bromide) is substituted for the m-methoxybenzyl bromide solution.

The above procedure yields 40.27 g. (0.16 mole, 55.2 percent yield, b.p. 120°–125°C./0.05 mm.) of 3-phenyl-4-(o-methoxyphenyl)-2-butanone.

STEP C: Ethyl 8-(o-methoxybenzyl)-8-phenyl-9-oxodecanoate

Ethyl 8-(o-methoxybenzyl)-8-phenyl-9-oxodecanoate is prepared following substantially the same procedure as described in Example 4, Step B, except that 3-phenyl-4-(o-methoxyphenyl)-2-butanone (25.43 g., 0.1 mole) is substituted for 3,6-diphenyl-5-hexen-2-one.

The above procedure yields 17.32 g. (0.0422 mole, 42.2 percent yield, b.p. 202°–212°C./0.1 mm.) of ethyl 8-(o-methoxybenzyl)-8-phenyl-9-oxodecanoate.

STEP D: 8-(o-Methoxybenzyl)-8-phenyl-9-oxodecanoic acid

A mixture of ethyl 8-(o-methoxybenzyl)-8-phenyl-9-oxodecanoate (12.32 g., 0.03 mole), sodium hydroxide (1.80 g., 0.045 mole), water (20 ml.), and methanol (180 ml.) is stirred for 24 hours. The methanol is removed in vacuo; the residual oil is poured into 6N hydrochloric acid (150 ml.), extracted with ether, and the combined ether extracts dried over anhydrous sodium sulfate. The ether is removed in vacuo, and the residual oil is chromatographed through a silica gel column to obtain 8-(o-methoxybenzyl)-8-phenyl-9-oxodecanoic acid as an oil. This oil is triturated in a mixture of hexane (150 ml.) and ether (25 ml.) to obtain 8-(o-methoxybenzyl)-8-phenyl-9-oxodecanoic acid as a white solid, 5.7 g., .015 mole, 50 percent yield, m.p. 84°–86°C. Recrystallization from hexane yields the product as a crystalline solid, 4.7 g., m.p. 85°–87°C.

EXAMPLE 18

8-(2,3-Dimethoxybenzyl)-8-Phenyl-9-Oxodecanoic Acid

STEP A: 2,3-Dimethoxybenzyl bromide

Dry hydrogen bromide gas is passed into a chilled solution of 2,3-dimethoxybenzyl alcohol (50.46 g., 0.3 mole) in benzene (100 ml.) for 2 hours. The benzene solution containing 2,3-dimethoxybenzyl bromide is separated from the water layer that forms, and is dried over calcium chloride.

STEP B: 3-Phenyl-4-(2,3-dimethoxyphenyl)-2-butanone

3-Phenyl-4-(2,3-dimethoxyphenyl)-2-butanone is prepared following substantially the same procedure as described in Example 16, Step B, except that the dried solution from Step A (containing 2,3-dimethoxybenzyl bromide) is substituted for the m-methoxybenzyl bromide solution.

The procedure yields 46.02 g. (0.162 moles, 54 percent yield, b.p. 135°-138.5°C./0.1 mm.) of 3-phenyl-4-(2,3-dimethoxyphenyl)-2-butanone.

STEP C: Ethyl 8-(2,3-dimethoxybenzyl)-8-phenyl-9-oxodecanoate

Ethyl 8-(2,3-dimethoxybenzyl)-8-phenyl-9-oxodecanoate is prepared following substantially the same procedure as described in Example 4, Step B, except that 3-phenyl-4-(2,3-dimethoxyphenyl)-2-butanone (28.43 g., 0.1 mole) is substituted for 3,6-diphenyl-5-hexen-2-one.

The procedure yields 18.73 g. (0.0425 mole, 42.5 percent yield, b.p. 216°-222°C./0.2mm.) of ethyl 8-(2,3-dimethoxybenzyl)-8-phenyl-9-oxodecanoate.

STEP D: 8-(2,3-Dimethoxybenzyl)-8-phenyl-9-oxodecanoic acid

A mixture of ethyl 8-(2,3-dimethoxybenzyl)-8-phenyl-9-oxodecanoate (17.62 g., 0.04 mole), sodium hydroxide (2.40 g., 0.06 mole), water (20 ml.), and methanol (180 ml.) is stirred for twenty-four hours. The methanol is removed in vacuo; the residual oil is poured into 6N hydrochloric acid (150 ml.), extracted with ether, and the combined ether extracts dried over anhydrous sodium sulfate. The ether is removed in vacuo, and the residual oil is chromatographed through a silica gel column to obtain 8-(2,3-dimethoxybenzyl)-8-phenyl-9-oxodecanoic acid as an oil. This oil is triturated with hexane (150 ml.) to obtain a white solid, 9.15 g., 0.022 mole, 55 percent yield, m.p. 69°-73°C. Recrystallization from hexane yields a crystalline solid, 7.0 g., m.p. 71°-74°C.

EXAMPLE 19

8-(o-Chlorobenzyl)-8-Phenyl-9-Oxodecanoic Acid

STEP A: 4-(o-Chlorophenyl)-3-phenyl-2-butanone

Following the procedure of Example 4, Step A, except that o-chlorobenzyl chloride (48.3 g., 0.3 mole) is substituted for cinnamyl chloride there is obtained 4-(o-chlorophenyl-3-phenyl-2-butanone, b.p. 100°-111°C./0.12 mm.

STEP B: Ethyl 8-(o-chlorobenzyl)-8-phenyl-9-oxodecanoate

Following the general procedure of Example 4, Step B, using 4-(o-chlorophenyl)-3-phenyl-2-butanone (51.70 g., 0.2 mole), sodium hydride (8.6 g., 0.2 mole, 57 percent oil dispersion), ethyl 7-bromoheptanoate (47.44 g., 0.2 mole), benzene (200 ml.), and DMF (200 ml.) there is obtained 38.9 g. (0.094 mole, 47 percent) of ethyl 8-(o-chlorobenzyl)-8-phenyl-9-oxodecanoate, b.p. 210°-212°C./0.2 mm.

STEP C: 8-(o-Chlorobenzyl)-8-phenyl-9-oxodecanoic acid

A mixture of ethyl 8-(o-chlorobenzyl)-8-phenyl-9-oxodecanoate (38.94 g., 0.094 mole), sodium hydroxide (3.76 g., 0.094 mole), water (20 ml.), and methanol (180 ml.) is stirred under nitrogen for forty-eight hours. The methanol is removed in vacuo and the residue treated with water (500 ml.) and 2N sulfuric acid (100 ml.). The organic phase is extracted into ether, washed, and dried over anhydrous sodium sulfate. Removal of the solvent in vacuo, followed by short-path vacuum distillation (226°-234°C./0.1-0.2 mm.) gives 8-(o-chlorobenzyl)-8-phenyl-9-oxodecanoic acid which solidifies on admixture with cyclohexane. After several recrystallizations from butyl chloridepetroleum ether there is obtained 9.23 g. of produce, m.p. 68.5°-70.5°C.

EXAMPLE 20

8-(o-Chlorobenzyl)-8-phenyl-9-oxodecanoic Acid

STEP A: 8-(o-Chlorobenzyl)-8-phenyl-9-oxodecanonitrile

In a 4-liter, 4-necked, round-bottomed flask equipped with a mechanical stirrer, a dry nitrogen inlet tube, a thermometer and a condenser capped with a soda-lime drying tube is placed 4-(o-chlorophenyl)-3-phenyl-2-butanone (88 gm., 0.34 mole) and dry benzene (375 ml.). A stream of dry nitrogen is admitted to the reaction vessel. The stirrer is started and sodamide (13.3 gm., 0.34 mole) added. The flask is heated by means of an electric heating mantle and when the temperature reaches 65°-70°C. the evolution of ammonia becomes vigorous. After the evolution of ammonia subsides the contents of the reaction vessel are refluxed for 2.5 hours and then cooled to ambient temperature. 7-Bromoheptanonitrile (65 gm., 0.34 mole) is added all at once which induces a slight temperature rise.

The reaction mixture is stirred and heated to reflux when a few crystals of iodine are added. Heating is continued for 20 hours during which time sodium bromide slowly separates. The mixture is cooled, methanol (20 ml.) added to decompose any unreacted sodamide, and the salt removed by filtration. The salt is washed with methanol and the combined filtrate and washings concentrated by evaporation at reduced pressure. Vacuum distillation of the residue gives 61 gm. (49 percent) of 8-phenyl-8-(o-chlorobenzyl)-9-oxodecanonitrile, b.p. 215°-225°C. at 0.05 mm. of Hg. Redistillation gives 50 gm. of product, b.p. 224°-227°C. at 0.05 mm. Hg.

STEP B: 8-(o-Chlorobenzyl)-8-phenyl-9-oxodecanoic acid

In a 1-liter flask equipped with a reflux condenser is placed glacial acetic acid (275 ml.), water (65 ml.), concentrated sulfuric acid (49 ml.) and 8-(o-chlorobenzyl)-8-phenyl-9-oxo-decanonitrile (49 gm., 0.134 mole). The resulting solution is heated at reflux, using an electric heating mantle, for 2 hours. The hot reaction mixture is poured with stirring onto crushed ice (1 kg.). After standing for an hour, the aqueous solution is decanted from the viscous residue. The residue is treated with hot 1N sodium hydroxide solution (400 ml.) and water added (400 ml.).

The resulting solution is treated with benzene (400 ml.) and 6N hydrochloric acid (125 ml.) is added. After thoroughly mixing the two liquid phases by shaking in a separatory funnel, the benzene layer is removed, washed with water, dried over anhydrous sodium sulfate and filtered.

The solvent is removed by evaporation at reduced pressure and the residue distilled in vacuo. The yield of 8-phenyl-8-(o-chlorobenzyl)-9-oxo-decanoic acid, b.p. 240°-245°C. at 0.03 mm. Hg. is 33.5 g. (66 percent). The product which crystallizes upon standing is recrystallized first from cyclohexane and finally from a mix-

EXAMPLE 21

8-(o-Fluorobenzyl)-8-phenyl-9-oxodecanoic Acid

STEP A: 3-Phenyl-4-(o-fluorophenyl)-2-butanone

A solution of phenylacetone (13.4 g., 0.10 mole) in benzene (50 ml.) and dimethylformamide (50 ml.) is added dropwise in a nitrogen atmosphere to a stirred suspension of sodium hydride (2.4 g., 0.10 mole) in benzene (50 ml.) and DMF (50 ml.). Following cessation of hydrogen evolution the reaction mixture is heated at 60°C. for 10 minutes, cooled to 25°C., treated with o-fluorobenzyl chloride (14.5 g., 0.10 mole), refluxed for ½ hour and poured into ice water (200 ml.) containing hydrochloric acid (5 ml.). The mixture is extracted with ether, and the ether extract washed with water, dried over magnesium sulfate and distilled affording 18 g. (72 percent) of 3-phenyl-4-(o-fluorophenyl)-2-butanone which distills at 122°C./0.1 mm.

STEP B: 8-(o-Fluorobenzyl)-8-phenyl-9-oxodecanoic Acid

A stirred suspension of sodium hydride (920 mg., 0.038 mole) in a mixture of benzene (40 ml.) and DMF (40 ml.) in an inert atmosphere is warmed to 60°C. and treated dropwise during a ½ hour period with 3-phenyl-4-(o-fluorophenyl)-2-butanone (10.0 g., 0.041 mole). The reaction mixture is then refluxed for ½°hour, cooled to 25°C. and treated with ethyl 7-bromoheptanoate (0.5 g., 0.040 mole). The mixture is refluxed for one hour then poured into ice water (300 ml.) containing hydrochloric acid (5 ml.). The ester so obtained is extracted into ether, the ether extract washed with water, dried over magnesium sulfate and the ether distilled. The residual product is hydrolyzed in a mixture of methanol (60 ml.), water (6 ml.) and sodium hydroxide (0.9 g.) at 25°C. for 18 hours. Following evaporation of 40 ml. of methanol and treatment with dilute aqueous hydrochloric acid the product is purified by column chromatography on silica gel (chloroform) to afford 8-(o-fluorobenzyl)-8-phenyl-9-oxodecanoic acid as a viscous oil, pmr (CDCl$_3$) δ1.95 (S, 3H, CH$_3$CO), 6.6-7.3 (M, 9H, aromatic), 9.0 (S, 1H, -COOH).

EXAMPLE 22

8-(o-Fluorobenzyl)-8-Phenyl-9-Oxodecanoic Acid

STEP A: Ethyl 8-phenyl-9-oxodecanoate

A solution of phenylacetone (26.8 g., 0.20 mole) in benzene (50 ml.) and DMF (50 ml.) is added dropwise in a nitrogen atmosphere during a ½ hour period to a stirred suspension of sodium hydride (4.8 g., 0.20 mole) in benzene (100 ml.) and DMF (100 ml.). It is then refluxed for ten minutes and cooled to 25°C. Ethyl 7-bromoheptanoate (47.4 g., 0.20 mole) is added to the reaction mixture which is then stirred for one hour at 25°C. and ½°hour at reflux temperature. The cooled reaction mixture is poured into ice water (500 ml.), and extracted with benzene (200 ml.). The benzene extract is washed with water (2 × 200 ml.), dried over magnesium sulfate and distilled. There is collected 34.5 g. (60 percent) of ethyl 8-phenyl-9-oxodecanoate which distills at 158°-160°C./0.1 mm.

STEP B: 8-(o-Fluorobenzyl)-8-phenyl-9-oxodecanoic acid

A solution of ethyl 8-phenyl-9-oxodecanoate (11.6 g., 0.04 mole) in benzene (15 ml.) and DMF (50 ml.) is added dropwise in a nitrogen atmosphere during a ½ hour period to a warmed (60°C) suspension of sodium hydride (0.96 g., 0.04 mole) in benzene (15 ml.) and DMF (15 ml.). The reaction mixture is refluxed for 10 minutes, cooled to 25°C., treated with o-fluorobenzyl chloride (5.8 g., 0.04 mole) and stirred at 25°C. for 2 hours. The mixture is then refluxed for ½ hour and poured into ice water (200 ml.) containing hydrochloric acid (5 ml.). The resulting ester is extracted into benzene (100 ml.), the benzene extract washed with water, dried over magnesium sulfate and distilled at reduced pressure to remove solvent and unreacted starting materials. The residual product ester is hydrolysed in a mixture of ethyl alcohol (30 ml.), water (20 ml.) and 10N sodium hydroxide (4 ml.) by heating at reflux for 1 hour. It is then cooled, acidified, extracted into ether, the ether washed with water, and dried over magnesium sulfate. Purification is effected by column chromatography on silica (chloroform) affording 8-(o-fluorobenzyl)-8-phenyl-9-oxodecanoic acid as a viscous oil, pmr (CDCl$_3$) δ1.95 (S, 3H, CH$_3$CO), 6.6-7.3 (M, 9H, aromatic), 9.0 (S, 1H, -COOH).

EXAMPLE 23

8-(o-Trifluoromethylbenzyl)-8-Phenyl-9-Oxodecanoic Acid

STEP A: 3-Phenyl-4-(o-trifluoromethylphenyl)-2-butanone

By following the procedure described in Example 21, Step A, but using the following as the reactants:

| | | |
|---|---|---|
| phenylacetone | 6.0 g. | (0.045 mole) |
| sodium hydride | 1.09 g. | (0.045 mole) |
| benzene | 50 ml. | |
| DMF | 50 ml. | |
| o-trifluoromethylbenzyl bromide | 12.2 g. | (0.051 mole) | there is obtained 5.0 g. (38%) %) of 3-phenyl-4-(o-trifluoromethylphenyl)-2-butanone which distills at 122°-124°C./0.5 mm.

STEP B: 8-(o-Trifluoromethylbenzyl)-8-phenyl-9-oxodecanoic acid

By following the procedure described in Example 21, Step B, but using the following as the reactants:

| | | |
|---|---|---|
| 3-phenyl-4-(o-trifluoromethylphenyl)-2-butanone | 5.0 g. | (0.017 mole) |
| sodium hydride | 0.46 g. | (0.019 mole) |
| benzene | 30 ml. | |
| DMF | 30 ml. | |
| ethyl 7-bromoheptanoate | 4.2 g. | (0.018 mole) | and carrying out the hydrolysis as described in Example 21, Step B, there is obtained 2.3 g. (32 percent) of 8-(o-trifluoromethylbenzyl)-8-phenyl-9-oxodecanoic acid as a viscous oil, pmr (CDCl$_3$) δ 1.95 (S, 3H, CH$_3$CO), 6.8-7.0 (M, 9H, aromatic), 10.5 (S, 1H, -COOH).

EXAMPLE 24

8-(p-Hydroxymethylbenzyl)-8-Phenyl-9-Oxodecanoic Acid

STEP A: Methyl p-(2-phenyl-3-oxobutyl)benzoate

A solution of phenylacetone (13.4 g., 0.10 mole) in benzene (50 ml.) and DMF (50 ml.) is added dropwise in a nitrogen atmosphere during a ½ hour period to a stirred suspension of sodium hydride (2.4 g., 0.10 mole) in benzene (25 ml.) and DMF (25 ml.). The reaction mixture is refluxed for ½ hour, cooled to 25°C. and treated with methyl p-bromomethylbenzoate (23 g., 0.10 mole). The reaction mixture is stirred for one hour at 25°C. then poured into water (300 ml.) containing hydrochloric acid (5 ml.). The product is extracted into ether (200 ml.), washed with water, and dried over magnesium sulfate. The solution is distilled affording 20.5 g. (57 percent) of pure methyl p-(2-phenyl-3-oxobutyl)benzoate which distills at 175°–178°C./0.1 mm.

STEP B: Methyl p-(2-phenyl-3-ethylenedioxybutyl)-benzoate

A solution of methyl p-(2-phenyl-3-oxobutyl)-benzoate (20.5 g., 0.073 mole), ethylene glycol (17 ml.), p-toluenesulfonic acid monohydrate (0.3 g.) in benzene (150 ml.) is refluxed for 18 hours. The water which is formed is collected by means of a constant water separator. The reaction mixture is poured into ice water and extracted with ether (100 ml.). The ether extract is washed with water and dried over magnesium sulfate. Evaporation of the volatile solvents leaves 24.6 g. (100 percent) of methyl p-(2-phenyl-3-ethylenedioxybutyl)benzoate which melts at 112°C. after crystallization from hexane.

STEP C: p-(2-Phenyl-3-ethylenedioxybutyl)benzyl alcohol

A solution of methyl p-(2-phenyl-3-ethylenedioxybutyl)benzoate (24 g., 0.073 mole) in benzene (50 ml.) is added dropwise in a nitrogen atmosphere to a stirred solution composed of 70 percent sodium bis-(2-methoxyethoxy)-aluminum hydride in benzene (26 ml.) and benzene (50 ml.). The reaction mixture is warmed to 70°C., then cooled to 10°C. and slowly treated with 10 percent aqueous hydrochloric acid (60 ml.). The reaction mixture is filtered and extracted with ether (100 ml.). The ether extract is washed with water and and dried over magnesium sulfate. Evaporation of the volatile solvents affords a quantitative yield of p-(2-phenyl-3-ethylenedioxybutyl)benzyl alcohol.

STEP D: 3-Phenyl-4-[p-(hydroxymethyl)phenyl]-2-butanone

A solution of p-(2-phenyl-3-ethylenedioxybutyl)-benzyl alcohol (24 g., 0.08 mole), acetone (240 ml.) and 10 percent aqueous hydrochloric acid (60 ml.) is stirred at 25°C. for 2 hours. The acetone is distilled at 45°C. at reduced pressure and the product is dissolved in ether (100 ml.). The ether solution is washed with water and dried over magnesium sulfate. Evaporation of the ether affords 17.4 g. (85 percent) of 3-phenyl-4-[p-(hydroxymethyl)phenyl]-2-butanone.

STEP E: 3-Phenyl-4-[p-(tetrahydropyran-2-yloxymethyl)-phenyl]-2-butanone

A stirred mixture of 3-phenyl-4-[p-(hydroxymethyl)-phenyl]-2-butanone (17 g., 0.67 mole) and dihydropyran (15 ml.) is cooled to 15°C. and treated with concentrated hydrochloric acid (1 drop). The reaction mixture is stirred at 25°C. for 2 hours and poured into ether (100 ml.). The ether is washed with water (50 ml.) containing 5 percent sodium hydroxide (1 ml.), then with saturated aqueous sodium chloride. It is then dried over potassium carbonate and distilled affording 16.5 g. (72 percent) of 3-phenyl-4-[p-(tetrahydropyran-2-yloxymethyl)phenyl]-2-butanone which distills at 195°–205°C./0.3 mm.

STEP F: 8-(p-Hydroxymethylbenzyl)-8-phenyl-9-oxodecanoic acid

A solution of 3-phenyl-4-[p-(tetrahydropyran-2-yloxymethyl)phenyl]-2-butanone (9.8 g., 0.029 mole) in benzene (20 ml.) and DMF (20 ml.) is added dropwise in an inert atmosphere to a warm (70°C.) stirred suspension of sodium hydride (720 mg., 0.03 mole) in benzene (30 ml.) and DMF (30 ml.) during a twenty minute period. The reaction mixture is refluxed for ½ hour, cooled to 50°C., treated with ethyl 7-bromoheptanoate (7.1 g., 0.03 mole), and refluxed for 1-½ hours. It is then poured into ice water (200 ml.) containing hydrochloric acid (2 ml.). The product obtained is extracted into ether (150 ml.) and the ether extract washed with water and dried over magnesium sulfate. Following distillation of solvent and unreacted starting material, the resulting ester is hydrolyzed using ethanol (25 ml.), water (25 ml.), and 10N sodium hydroxide (3 ml.) and refluxed for ½ hour. The reaction mixture is poured into ice water (100 ml.), washed with two 100 ml. portions of ether and then acidified with hydrochloric acid. The resulting product is extracted into ether (100 ml). The ether extract is washed with water, dried over magnesium sulfate and the ether is distilled at reduced pressure. To the residual oil is added 2-propanol (30 ml.), water (20 ml.), and concentrated hydrochloric acid (5 ml.). After refluxing for 1 hour, the reaction mixture is poured into ice water and extracted with ether. The ether extract is washed with water, and dried over magnesium sulfate. After distillation of the ether there is obtained 7.3 g. of crude material (which contains a small amount of isopropyl ester of the desired compound). Hydrolysis is effected by refluxing this product with 50 percent aqueous ethanol (50 ml.) containing sodium bicarbonate (2.4 g.) for one hour. This is followed by acidification, extraction into ether, washing of the ether with water, drying over magnesium sulfate and distillation of the ether to obtain 4.3 g (39 percent) of 8-(p-hydroxymethylbenzyl)-8-phenyl-9-oxodecanoic acid as a viscous oil, pmr (CDCl$_3$) δ 1.95 (S, 3H, CH$_3$CO), 6.9–7.4 (M, 9H, aromatic).

EXAMPLE 25

8-(m-Hydroxymethylbenzyl)-8-Phenyl-9-Oxodecanoic Acid

STEP A: Methyl m-(2-phenyl-3-oxobutyl)benzoate

By following the procedure as described in Example 24, Step A, but using the followiwng reactants:

| | | |
|---|---|---|
| phenylacetone | 14.7 g. | (0.11 mole) |
| sodium hydride | 2.64 g. | (0.11 mole) |
| benzene | 90 ml | |
| DMF | 90 ml. | |
| methyl m-bromomethyl-benzoate | 25 g. | (0.11 mole) | there is obtained 20.5 g. (66 percent) of methyl m-(2-phenyl-3-oxobutyl)benzoate which boils at 162°C./0.1 mm.

STEP B: Methyl m-(2-phenyl-3-ethylenedioxybutyl)-benzoate

By following the procedure as described in Example 24, Step b, but using the following reactants:

| | | |
|---|---|---|
| methyl m-(2-phenyl-3-oxobutyl)benzoate | 20.5 g. | (0.073 mole) |

| | | |
|---|---|---|
| benzene | 150 ml. | |
| ethylene glycol | 17 ml. | |
| p-toluenesulfonic acid monohydrate | 150 mg. | | there is obtained 24 g. (100 percent) of methyl m-(2-phenyl-3-ethylendioxybutyl)benzoate.

STEP C: m-(2-Phenyl-3-ethylenedioxybutyl)benzyl alcohol

By following the procedure as described in Example 24, Step C, but using the following reactants:

| | | |
|---|---|---|
| methyl m-2-phenyl-3-ethylenedioxybutyl)benzoate | 24 g. | (0.074 mole) |
| 70% sodium bis-(2-methoxyethoxy)-aluminum hydride | 26 ml. | |
| benzene | 100 ml. | | there is obtained 22 g. (100% of m-(2-phenyl-3-ethylenedixoybutyl)benzyl alcohol.

STEP D: 3-Phenyl-4-[m-(hydroxymethyl)-phenyl]-2-butanone

By following the procedure as described in Example 24, Step D, but using the following reactants:

| | | |
|---|---|---|
| m-(2-phenyl-3-ethylenedioxybutyl)-benzyl alcohol | 11.00 g. | (0.037 mole) |
| acetone | 120 ml. | |
| 10% hydrochloric acid | 30 ml. | | there is obtained 9 g. (94%) of 3-phenyl-4-[m-(hydroxymethyl)phenyl]-2-butanone.

STEP E: 3-Phenyl-4-[m-(tetrahydropyran-2-yloxymethyl)phenyl]-2-butanone

By following the procedure as described in Example 24, Step E, but using the following reactants:

| | | |
|---|---|---|
| 3-phenyl-4-[m-(hydroxymethyl)-phenyl]-2-butanone | 5.08 g. | (0.02 mole) |
| dihydropyran | 4.0 ml. | |
| concentrated hydrochloric acid | ½ drop | | there is obtained 5.0 g. (74 percent) of 3-phenyl-4-[m-(tetrahydropyran-2-yloxymethyl)-phenyl]-2-butanone which boils at 178°–183°C./0.1 mm.

STEP F: 8(m-Hydroxymethylbenzyl)-8-phenyl-9-oxodecanoic acid

By following the procedure as described in Example 24, Step F, but using the following reactants:

| | | |
|---|---|---|
| 3-phenyl-4-[m-(tetrahydropyran-2-yl-oxymethyl)-phenyl]-2-butanone | 8.0 g. | (0.021 mole) |
| sodium hydride | 0.60 g. | (0.025 mole) |
| benzene | 50 ml. | |
| DMF | 50 ml. | |
| ethyl 7-bromoheptanoate | 5.7 g. | (0.024 mole) | and conducting the hydrolysis as described in Example 24, Step F, there is obtained 2.1 g. (26 percent) of 8-(m-hydroxymethylbenzyl)-8-phenyl-9-oxodecanoic acid as a viscous oil, pmr (CDCl$_3$) δ 1.90 (S, 3H, CH$_3$CO), 6.7-7.4 (M, 9H, aromatic).

EXAMPLE 26

8-(o-Hydroxymethylbenzyl)-8-Phenyl-9-Oxodecanoic Acid

STEP A: Methyl o-(2-phenyl-3-oxobutyl)benzoate

By following the procedure as described in Example 24, Step A, but using the following reactants:

| | | |
|---|---|---|
| phenyl acetone | 11.2 g. | (0.084 mole) |
| sodium hydride | 2.03 g. | (0.085 mole) |
| benzene | 75 ml. | |
| DMF | 75 ml. | |
| methyl o-bromomethylbenzoate | 19 g. | (0.083 mole) | there is obtained 9.2 g. (40 percent) of methyl o-(2-phenyl-3-oxobutyl)benzoate which distills at 158°–168°C./0.1 mm.

STEP B: Methyl o-(2-phenyl-3-ethylenedioxybutyl)-benzoate

By following the procedure described in Example 24, Step B, but using the following reactants:

| | | |
|---|---|---|
| methyl o-(2-phenyl-3-oxobutyl)-benzoate | 9.2 g. | (0.033 mole) |
| ethylene glycol | 7.5 ml. | |
| p-toluenesulfonic acid monohydrate | 0.1 g. | |
| benzene | 90 ml. | | there is obtained 10.8 g. (100 percent) of methyl o-(2-phenyl-3-ethylenedioxybutyl)benzoate.

STEP C: o-(2-Phenyl-3-ethylenedioxybutyl)benzyl alcohol

By following the procedure as described in Example 24, Step C, but using the following reactants:

| | | |
|---|---|---|
| methyl o-(2-phenyl-3-ethylenedioxybutyl)benzoate | 10.8 g. | (0.033 mole) |
| 70% sodium bis-(2-methoxyethoxy-aluminum hydride | 12 ml. | |
| benzene | 60 ml. | | there is obtained 9.2 g. (94 percent) of o-(2-phenyl-3-ethylenedioxybutyl)-benzyl alcohol.

STEP D: 3-Phenyl-4-[o-(hydroxymethyl)-phenyl]-2-butanone

By following the procedure described in Example 24, Step D, but using the following reactants:

| | | |
|---|---|---|
| o-(2-phenyl-3-ethylenedioxybutyl)benzyl alcohol | 9.2 g. | (0.031 mole) |
| acetone | 120 ml. | |
| 10% hydrochloric acid | 30 ml. | | there is obtained 7.8 g. (100%) of 3-phenyl-4-[o-(hydroxymethyl)-phenyl]-2-butanone.

STEP E: 3-Phenyl-4-[o-(tetrahydropyran-2-yloxymethyl)-phenyl]-2-butanone

By following the procedure described in Example 24, Step E, but using the following reactants:

| | | |
|---|---|---|
| 3-phenyl-4-[o-(hydroxymethyl)-phenyl]-2-butanone | 7.8 g. | (0.031 mole) |
| dihydropyran | 7 ml. | |
| concentrated hydrochloric acid | 1 drop | | there is obtained 7.8 g. (75 percent) of 3-phenyl-4-[o-tetrahydropyran-2-yloxymethyl)-phenyl]-2-butanone which distills at 195°–205°C./0.2 mm.

STEP F: 8-(o-Hydroxymethylbenzyl)-8-phenyl-9-oxodecanoic acid

By following the procedure as described in Example 24, Step F, but using the following reactants:

3-phenyl-4-[o-(tetrahydropyran-

| 2-yl-oxymethyl)-phenyl]-2-butanone | 7.6 g. | (0.024 mole) |
|---|---|---|
| sodium hydride | 0.55 g. | (0.023 mole) |
| benzene | 40 ml. | |
| DMF | 40 ml. | |
| ethyl 7-bromoheptanoate | 10.8 g. | (0.046 mole) | and conducting the hydrolysis as described in Example 24, Step F, there is obtained 3.0 g. (34 percent) of 8-(o-hydroxymethylbenzyl)-8-phenyl-9-oxodecanoic acid as a viscous oil, pmr (CDCl$_3$) δ1.98 (S, 3H, CH$_3$CO), 6.8–7.5 (M, 9H, aromatic).

EXAMPLE 27

8-(o-Bromobenzyl)-8-Phenyl-9-Oxodecanoic Acid

By following the procedure as described in Example 21, Step B, using as the reactants:

| 3-phenyl-4-(o-bromophenyl)-2-butanone | 6.06 g. | (0.02 mole) |
|---|---|---|
| sodium hydride | 0.5 g. | (0.021 mole) |
| benzene | 20 ml. | |
| DMF | 20 ml. | |
| ethyl 7-bromoheptanoate | 5.0 g. | (0.021 mole) | and conducting the hydrolysis as described in Example 21, Step B, there is obtained 1.2 g. (14 percent) of 8-(o-bromobenzyl-8-phenyl-9-oxodecanoic acid which melts at 58°–60°C. after recrystallization from butyl chloride-hexane.

EXAMPLE 28

8-(m-Acetoxymethylbenzyl)-8-Phenyl-9-Oxodecanoic Acid

A solution of 3-phenyl-4-[m-(tetrahydropyran-2-yloxymethyl)-phenyl]-2-butanone (4.9 g., 0.0145 mole) in benzene (20 ml.) is added dropwise in a nitrogen atmosphere to a warm (65°C.), stirred suspension of sodium hydride (370 mg., 0.0155 mole) in benzene (25 ml.) and DMF (25 ml.) during a ½ hour period. The reaction mixture is refluxed for ½ hour, cooled to 50°C., treated with ethyl 7-bromoheptanoate (3.5 g., 0.0145 mole), refluxed for 1-½ hours, poured into ice water (200 ml.) and neutralized with hydrochloric acid. The reaction mixture is extracted into ether (100 ml.) and the ether extract washed with water and dried over magnesium sulfate. The solvents and unreacted starting material are distilled at reduced pressure and the remaining oil is allowed to react with acetic acid (60 ml.) and 5 percent hydrochloric acid (15 ml.) at 100°C. for ¾ hour. The cooled reaction mixture is poured into water (300 ml.), and extracted with ether (200 ml.). The ether extract is washed four times with 200 ml. portions of water and then with a saturated sodium chloride solution. The ether solution is extracted with dilute aqueous sodium bicarbonate and the aqueous layer is acidified with dilute hydrochloric acid. The product that separates is extracted with ether, the ether extract washed with water and dried over magnesium sulfate. Evaporation of the ether leaves 2.0 g. (33 percent) of crude 8-(m-acetoxymethylbenzyl)-8-phenyl-9-oxodecanoic acid as a tan oil which is purified by chromatography on 80 g. of silica (3 percent 2-propanol in chloroform), pmr (CDCl$_3$) δ1.92 (S, 3H, CH$_3$CO), 2.06 (S, 3H, CH$_3$COO), 6.9–7.3 (M, 9H, aromatic), 9.5 (S, 1H, -COOH).

EXAMPLE 29

8-(p-Hydroxybenzyl)-8-Phenyl-9-Oxodecanoic Acid

By following the procedure described in Example 22, Step B, but using the following reactants:

| ethyl 8-phenyl-9-oxodecanoate | 5.2 g. | (0.018 mole) |
|---|---|---|
| sodium hydride | 435 mg. | (0.018 mole) |
| benzene | 30 ml. | |
| DMF | 30 ml. | |
| p-acetoxybenzyl chloride | 3.3 g. | (0.018 mole) | followed by hydrolysis as described in Example 22, Step B, there is obtained 8-(p-hydroxybenzyl)-8-phenyl-9-oxodecanoic acid as a viscous oil, pmr (CDCl$_3$) δ2.03 (S, 3H, CH$_3$CO), 6.4–7.5 (M, 9H, aromatic), 8.1–8.3 (S, 2H, ArOH = COOH).

EXAMPLE 30

8-(o-Chlorobenzyl)-8-(o-Chlorophenyl)-9-Oxodecanoic Acid

By following the procedure described in Example 21, Step B, but using the following reactants:

| 3,4-bis-(o-chlorophenyl)-2-butanone | 8.8 g. | (0.03 mole) |
|---|---|---|
| sodium hydride | 715 mg. | (0.03 mole) |
| benzene | 40 ml. | |
| DMF | 35 ml. | |
| ethyl 7-bromoheptanoate | 7.2 g. | (0.03 mole) | followed by the hydrolysis as described in Example 21, Step B, thee is obtained 8-(o-chlorobenzyl)-8-(o-chlorophenyl)-9-oxodecanoic acid as a viscous oil, pmr (CDCl$_3$) δ2.05 (S, 3H, CH$_3$CO), 6.8–7.4 (M, 8H, aromatic), 11.0 (S, 1H, COOH).

EXAMPLE 31

8-(o-Chlorobenzyl)-8-Phenyl-9-Oxoundecanoic Acid

STEP A: Ethyl 8-phenyl-9-oxoundecanoate

By following the procedure described by Example 22, Step A, but using the following reactants:

| 1-phenyl-2-butanone | 29.6 g. | (0.20 mole) |
|---|---|---|
| sodium hydride | 4.8 g. | (0.20 mole) |
| benzene | 150 ml. | |
| DMF | 150 ml. | |
| ethyl 7-bromoheptanoate | 47.4 g. | (0.20 mole) | there is obtained 47 g. (77 percent) of ethyl 8-phenyl-9-oxoundecanoate which distills at 150°–157°C./0.05 mm.

STEP B: 8-(o-Chlorobenzyl)-8-phenyl-9-oxoundecanoic acid

By following the procedure described in Example 22, Step B, but using the following reactants:

| ethyl 8-phenyl-9-oxoundecanoate | 12.1 g. | (0.04 mole) |
|---|---|---|
| sodium hydride | 960 mg. | (0.04 mole) |
| benzene | 30 ml. | |
| DMF | 30 ml. | |
| o-chlorobenzyl chloride | 7 g. | (0.044 mole) | followed by hydrolysis as described in Example 22, Step B, there is obtained 1.4 g. of 8-(o-chlorobenzyl)-8-phenyl-9-oxoundecanoic acid as a white crystalline solid which melts after recrystallization from hexane at 79°–80°C.

EXAMPLE 32

9-(o-Chlorobenzyl)-9-phenyl-10-oxoundecanoic Acid

By following the procedure described in Example 21, Step B, but using the following reactants:

| 3-phenyl-4-(o-chlorophenyl)- | | |
|---|---|---|
| 2-butanone | 10.3 g. | (0.04 mole) |
| sodium hydride | 960 mg. | (0.04 mole) |
| benzene | 60 ml. | |
| DMF | 60 ml. | |
| ethyl 8-bromooctanoate | 10.1 g., | (0.04 mole) | followed by hydrolysis as described in Example 21, Step B, there is obtained 7.5 g. (47 percent) of 9-(o-chlorobenzyl)-9-phenyl-10-oxoundecanoic acid as a viscous oil, pmr (CDCl$_3$) δ1.95 (S, 3H, CH$_3$CO), 6.8–7.4 (M, 9H, aromatic), 8.9 (S, 1H, -COOH).

EXAMPLE 33

5-[7-(o-Chlorobenzyl)-7-phenyl-9-oxononyl]tetrazole

A stirred mixture of 8-(o-chlorobenzyl)-8-phenyl-9-oxodencanonitrile (7.35 g., 0.020 mole), Example 3, Step A, sodium azide (1.43 g., 0.022 mole) and ammonium chloride (1.17 g., 0.022 mole) in DMF (30 ml.) is heated on a steam bath in a nitrogen atmosphere for 1 hour, cooled, and poured into ice water (150 ml.). Acidification of the aqueous solution causes precipitation of 5-[7-(o-chlorobenzyl)-7-phenyl-8-oxononyl]tetrazole which is filtered, washed with water and dried.

EXAMPLE 34

8-Phenyl-8-(5-phenylpentyl)-9-oxodecanoic Acid

STEP A: 3,8-Diphenyl-2-octanone 3,8-Diphenyl-2-octanone is prepared following substantially the same procedure described in Example 2, Step A where 5-phenyl-n-pentyl chloride (27.40 g., 0.15 mole) is substituted for (3-bromopropyl)benzene, and an equivalent amount of sodium hydride (6.45 g., 0.15 mole) and phenylacetone (20.13 g., 0.15 mole) are used.

The above procedure gives 26.40 g. (0.0943 mole, 63 percent yield) of 3,8-diphenyl-2-octanone (b.p. 140°–147°C./0.05 mm.).

STEP B: Ethyl 8-phenyl-8-(5-phenylpentyl)-9-oxodecanoate

Ethyl 8-phenyl-8-(5-phenylpentyl)-9-oxodecanoate is prepared following substantially the same procedure described in Example 2, Step B where 3,8-diphenyl-2-octanone (25.24 g., 0.09 mole) is substituted for 3,6-diphenyl-2-hexanone, and an equivalent amount of sodium hydride (3.78 g., 0.09 mole) and ethyl 7-bromoheptanoate (23.72 g., 0.10 mole) are used.

The above procedure gives 13.15 g. (0.03, 33.3 percent yield) of ethyl 8-phenyl-8-(5-phenylpentyl)-9-oxodecanoate (b.p. 221°–231°C./0.05 mm.).

STEP C: 8-Phenyl-8-(5-phenylpentyl)-9-oxodecanoic Acid

A mixture of ethyl 8-phenyl-8-(5-phenylpentyl)-9-oxodecanoate (13.0 g., 0.03 mole), NaOH (1.80 g., 0.045 mole), H$_2$O (20 ml.), and MeOH (180 ml.) is stirred for 24 hours. The MeOH is removed in vacuo; the residual oil is poured into 6NHCl(150 ml.), extracted with ether, and the combined ether extracts dried over anhydrous Na$_2$SO$_4$. The ether is removed in vacuo, and the residual oil is chromatographed through a silica gel column to obtain the pure product (oil, 4.47 g., 0.011 mole, 36.7% yield).

| Analysis | calculated for C$_{27}$H$_{36}$O$_3$: |
|---|---|
| | C, 79.37; H, 8.88 |
| Found: | |
| | C, 79.43; H, 8.81 |

EXAMPLE 35

8-Phenyl-8-(7-phenylheptyl)-9-oxodecanoic Acid

STEP A: 3,10-Diphenyl-2-decanone 3,10-Diphenyl-2-decanone is prepared following substantially the same procedure described in Example 2, Step A where 7-phenyl-n-heptyl chloride (30.0 g., 0.143 mole) is substituted for (3-bromopropyl)benzene, and essentially an equivalent amount of sodium hydride (6.45 g., 0.15 mole) and phenylacetone (20.13 g., 0.15 mole) are used.

The above procedure gives 25.29 g. (0.082 mole, 57.3 percent yield) of 3,10-diphenyl-2-decanone (b.p. 153°–160°C./0.05 mm.).

STEP B: Ethyl 8-phenyl-8-(7-phenylheptyl)-9-oxodecanoate

Ethyl 8-phenyl-8-(7-phenylheptyl)-9-oxodecanoate is prepared following substantially the same procedure described in Example 2, Step B where 3,10-diphenyl-2-decanone (24.68 g., 0.08 mole) is substituted for 3,6-diphenyl-2-hexanone, and an equivalent amount of sodium hydride (3.36 g., 0.08 mole) and ethyl 7-bromoheptanoate (21.34 g., 0.09 mole) are used.

The above procedure gives 15.40 g. (0.033, 41.3 percent yield) of ethyl 8-phenyl-8-(7-phenylheptyl)-9-oxodecanoate (b.p. 288°–236°C./0.05 mm.).

STEP C: 8-Phenyl-8-(7-phenylheptyl)-9-oxodecanoic Acid

A mixture of ethyl 8-phenyl-8-(7-phenylheptyl)-9-oxodecanoate (15.10 g., 0.0325 mole), NaOH (2.00 g., 0.05 mole), H$_2$O (20 ml.), and MeOH (180 ml.) is stirred for 24 hours. The MeOH is removed in vacuo; the residual oil is poured into 6NHCL (150 ml.), extracted with ether, and the combined ether extracts dried over anhydrous Na$_2$SO$_4$. The ether is removed in vacuo, and the residual oil is chromatographed through a silica gel column to obtain the pure product (oil, 4.17 g., 0.0096 mole, 30% yield).

| Analysis | calculated for C$_{29}$H$_{40}$O$_3$: |
|---|---|
| | C, 79.77; H, 9.23 |
| Found: | |
| | C, 79.75; H, 9.05 |

What is claimed is:

1. A compound having the formula

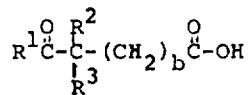

where

R$^1$ represents alkyl of 1–3 carbons or cyclopropyl;
R$^2$ represents phenyl, halophenyl, loweralkylphenyl or loweralkoxyphenyl;
R$^3$ represents

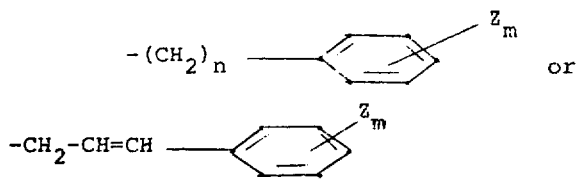

where n is an odd number up to 7, m is 0–2, and Z is halogen, loweralkyl, loweralkoxy, hydroxy, cyano, trifluoromethyl, hydroxymethyl or acyloxymethyl;

b has a value of 6–8; and salts esters and amides thereof.

2. A compound of claim 1 wherein $R^2$ is phenyl.

3. A compound of claim 1 wherein $R^1$ is methyl and $R^2$ is phenyl.

4. A compound of claim 1 wherein $R^1$ is methyl, $R^2$ is phenyl and $R^3$ is benzyl or substituted benzyl and the substituents are halogen, loweralkyl, loweralkoxy, hydroxy, cyano, trifluoromethyl, hydroxymethyl or loweralkanoyloxymethyl.

5. The compound of claim 1 which is 8-(o-chlorobenzyl)-8-phenyl-9-oxodecanoic acid.

6. The compound of claim 1 which is 8-(o-methylbenzyl)-8-phenyl-9-oxodecanoic acid.

7. The compound of claim 1 which is 8-(o-trifluoromethylbenzyl)-8-phenyl-9-oxodecanoic acid.

8. The compound of claim 1 which is 8-(2,6-dichlorobenzyl)-8-phenyl-9-oxodecanoic acid.

9. The compound of claim 1 which is 8-(2,4-dichlorobenzyl)-8-phenyl-9-oxodecanoic acid.

10. The compound of claim 1 which is 8-cinnamyl-8-phenyl-9-oxodecanoic acid.

11. The compound of claim 1 which is 8-(o-methylcinnamyl)-8-phenyl-9-oxodecanoic acid.

* * * * *